United States Patent
Duong et al.

(10) Patent No.: US 10,465,539 B2
(45) Date of Patent: Nov. 5, 2019

(54) ROTOR CASING

(71) Applicant: PRATT & WHITNEY CANADA CORP., Longueuil (CA)

(72) Inventors: Hien Duong, Mississauga (CA); Vijay Kandasamy, T. Palur (IN)

(73) Assignee: Pratt & Whitney Canada Corp., Longueuil, Quebec (CA)

( * ) Notice: Subject to any disclaimer, the term of this patent is extended or adjusted under 35 U.S.C. 154(b) by 271 days.

(21) Appl. No.: 15/669,180

(22) Filed: Aug. 4, 2017

(65) Prior Publication Data
US 2019/0040752 A1    Feb. 7, 2019

(51) Int. Cl.
  *F04D 29/52*  (2006.01)
  *F01D 9/04*   (2006.01)
  *F01D 25/24*  (2006.01)

(52) U.S. Cl.
  CPC ............. *F01D 9/041* (2013.01); *F01D 25/24* (2013.01)

(58) Field of Classification Search
  CPC ...... F04D 29/66; F04D 29/668; F04D 29/526; F04D 29/667; F01D 11/08
  See application file for complete search history.

(56) References Cited

U.S. PATENT DOCUMENTS

| | | | | |
|---|---|---|---|---|
| 2,043,416 A | * | 6/1936 | Lueg ........................ | F01N 1/065 181/197 |
| 2,783,008 A | * | 2/1957 | Bodine, Jr. ............. | B64C 21/00 244/130 |
| 2,989,136 A | * | 6/1961 | Wohlberg ............ | G10K 11/172 181/224 |
| 3,189,260 A | * | 6/1965 | Ivanov ................... | F04D 29/547 415/144 |
| 4,023,350 A | * | 5/1977 | Hovan ..................... | F01D 5/145 60/39.5 |
| 4,044,203 A | * | 8/1977 | Swinbanks ......... | F16L 55/0333 381/71.5 |
| 4,254,619 A | * | 3/1981 | Giffin, III ............... | F02K 3/075 244/55 |
| 4,602,410 A | * | 7/1986 | Karlsson ............... | F04D 29/547 29/889.3 |
| 4,844,692 A | * | 7/1989 | Minkkinen ............. | F01D 11/08 415/208.1 |
| 4,871,294 A | * | 10/1989 | Ivanov .................... | F01D 11/08 415/58.7 |

(Continued)

FOREIGN PATENT DOCUMENTS

EP    3064779 A1 *  9/2016  ........... F04D 27/001

*Primary Examiner* — Justin D Seabe
*Assistant Examiner* — Brian Christopher Delrue
(74) *Attorney, Agent, or Firm* — Norton Rose Fulbright Canada L.L.P.

(57) ABSTRACT

A rotor casing having an inner casing wall surrounding an annular gas path, a plurality of rotor blades radially extending into such annular gas path. The inner casing wall has an annular recess positioned radially outwardly of the gas path outer line and axially downstream of the rotor blades. A plurality of circumferentially spaced-apart vanes are positioned within the annular recess. The vanes may be profiled and circumferentially spaced from one another to accelerate air flowing between circumferentially adjacent vanes. The vanes may include an airflow partition extending between the top edges of at least 2 circumferentially adjacent vanes, from each such vanes' leading edge to each such vanes' trailing edge.

18 Claims, 4 Drawing Sheets

(56) References Cited

U.S. PATENT DOCUMENTS

| | | | | |
|---|---|---|---|---|
| 5,230,605 | A * | 7/1993 | Yamaguchi | F01D 17/162 415/151 |
| 5,282,718 | A * | 2/1994 | Koff | F01D 11/08 415/57.3 |
| 5,386,689 | A * | 2/1995 | Bozich | G10K 11/178 381/71.11 |
| 5,478,199 | A * | 12/1995 | Gliebe | B64D 33/02 415/119 |
| 5,489,186 | A * | 2/1996 | Yapp | F01D 5/141 415/208.3 |
| 5,515,444 | A * | 5/1996 | Burdisso | G10K 11/178 381/71.5 |
| 5,607,284 | A * | 3/1997 | Byrne | F01D 11/08 415/173.4 |
| 5,762,470 | A * | 6/1998 | Gelmedov | F04D 29/4213 415/119 |
| 5,952,621 | A * | 9/1999 | Curtis | B64D 33/02 181/213 |
| 5,966,452 | A * | 10/1999 | Norris | B06B 1/20 381/71.1 |
| 6,004,095 | A * | 12/1999 | Waitz | B64C 21/025 415/119 |
| 6,434,239 | B1 * | 8/2002 | DeLuca | G10K 11/1788 381/71.1 |
| 6,499,940 | B2 * | 12/2002 | Adams | F01D 11/08 415/121.2 |
| 6,585,479 | B2 * | 7/2003 | Torrance | F01D 11/08 415/115 |
| 6,935,833 | B2 * | 8/2005 | Seitz | F01D 5/145 415/58.1 |
| 6,973,193 | B1 * | 12/2005 | Tse | B64D 33/06 181/204 |
| 7,186,072 | B2 * | 3/2007 | Seitz | F01D 5/145 415/57.1 |
| 7,575,412 | B2 * | 8/2009 | Seitz | F01D 5/145 415/58.5 |
| 7,648,330 | B2 * | 1/2010 | Schwaller | F02C 7/045 415/1 |
| 7,661,261 | B2 * | 2/2010 | Julliard | F01D 5/147 415/115 |
| 7,665,964 | B2 * | 2/2010 | Taylor | F01D 5/143 415/194 |
| 7,819,224 | B2 * | 10/2010 | Borchers | F01D 25/30 181/213 |
| 8,337,146 | B2 * | 12/2012 | Yu | F01D 11/122 415/119 |
| 8,690,523 | B2 * | 4/2014 | Guemmer | F04D 29/164 415/173.1 |
| 8,834,122 | B2 * | 9/2014 | Ingram | F01D 11/001 416/191 |
| 9,341,075 | B2 * | 5/2016 | Christians | F01D 17/141 |
| 10,046,424 | B2 * | 8/2018 | Reynolds | F01D 5/145 |
| 10,047,620 | B2 * | 8/2018 | Giacche | F01D 11/001 |
| 2002/0117579 | A1 * | 8/2002 | Kotoulas | F16F 15/02 244/1 N |
| 2003/0056493 | A1 * | 3/2003 | Jannetta | F02K 1/72 60/226.2 |
| 2005/0118028 | A1 * | 6/2005 | Matheny | F01D 5/147 416/219 R |
| 2009/0053058 | A1 * | 2/2009 | Kohlenberg | B64D 33/04 415/227 |
| 2009/0245997 | A1 * | 10/2009 | Hurwitz | F01D 17/08 415/1 |
| 2010/0276007 | A1 * | 11/2010 | Hendricks | F02C 7/04 137/15.1 |
| 2011/0120080 | A1 * | 5/2011 | Schwark, Jr. | F02C 7/09 60/226.3 |
| 2012/0269619 | A1 * | 10/2012 | Johann | F04D 29/164 415/182.1 |
| 2014/0212261 | A1 * | 7/2014 | Schwarz | F04D 27/004 415/1 |
| 2015/0003976 | A1 * | 1/2015 | Zotz | F01D 9/02 415/208.1 |
| 2016/0084265 | A1 * | 3/2016 | Yu | F04D 29/542 |
| 2016/0169017 | A1 * | 6/2016 | Giacche | F01D 11/001 60/805 |
| 2016/0258440 | A1 * | 9/2016 | Henry | F04D 27/001 |

* cited by examiner

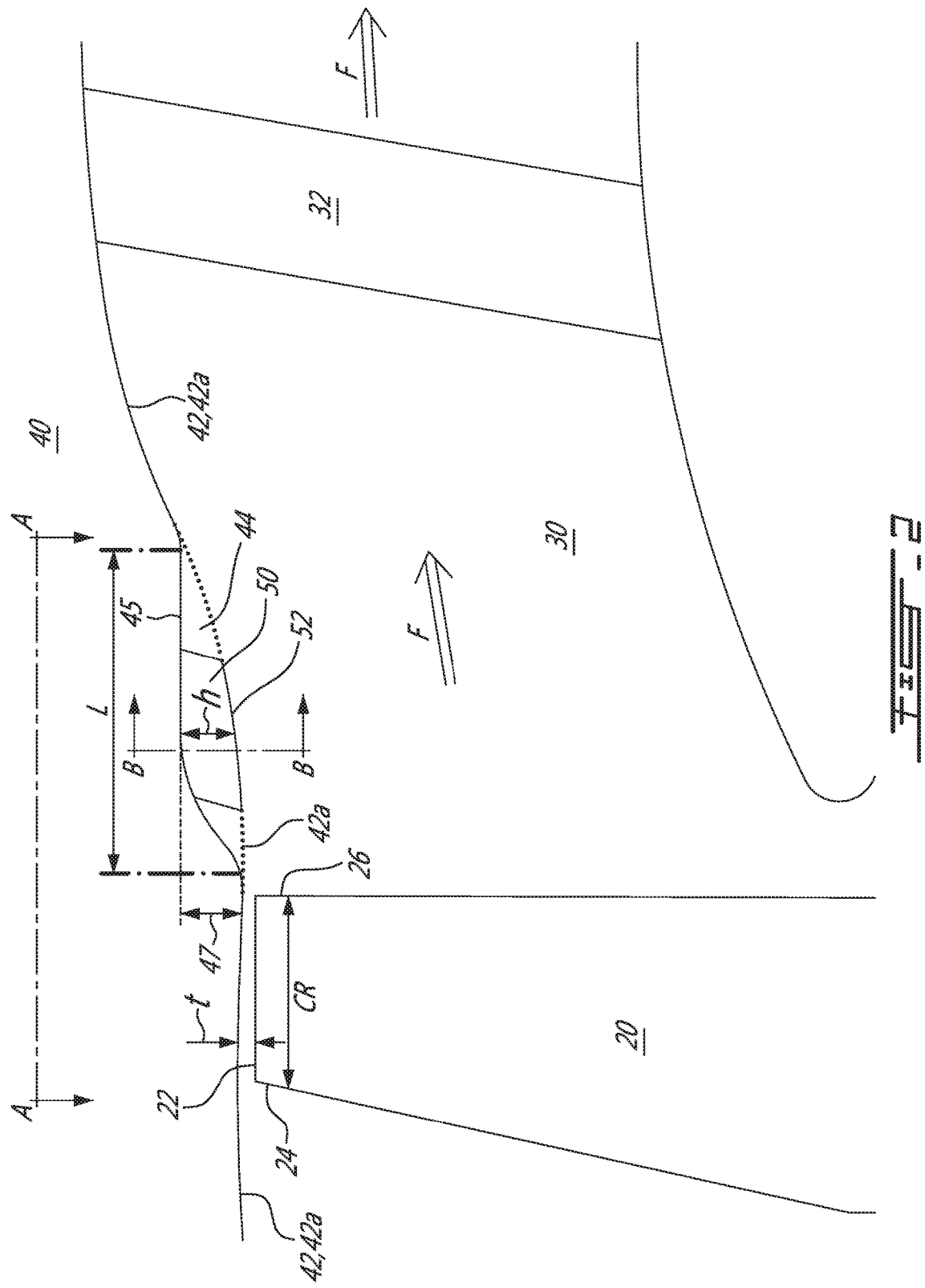

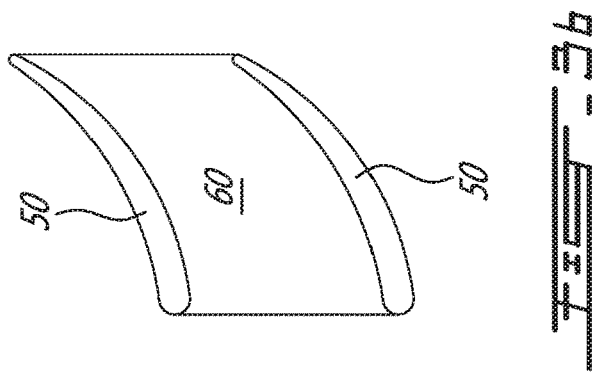
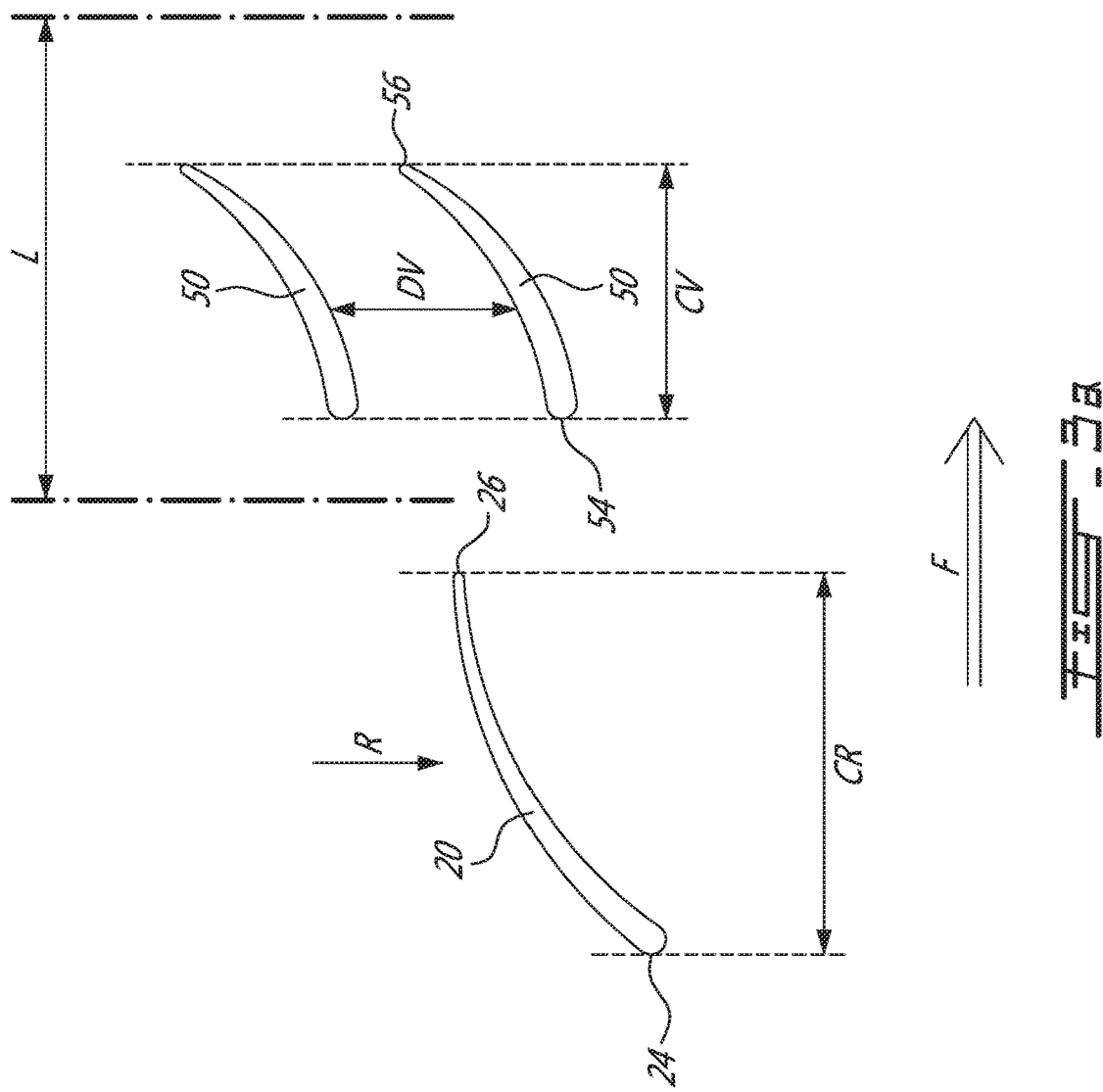

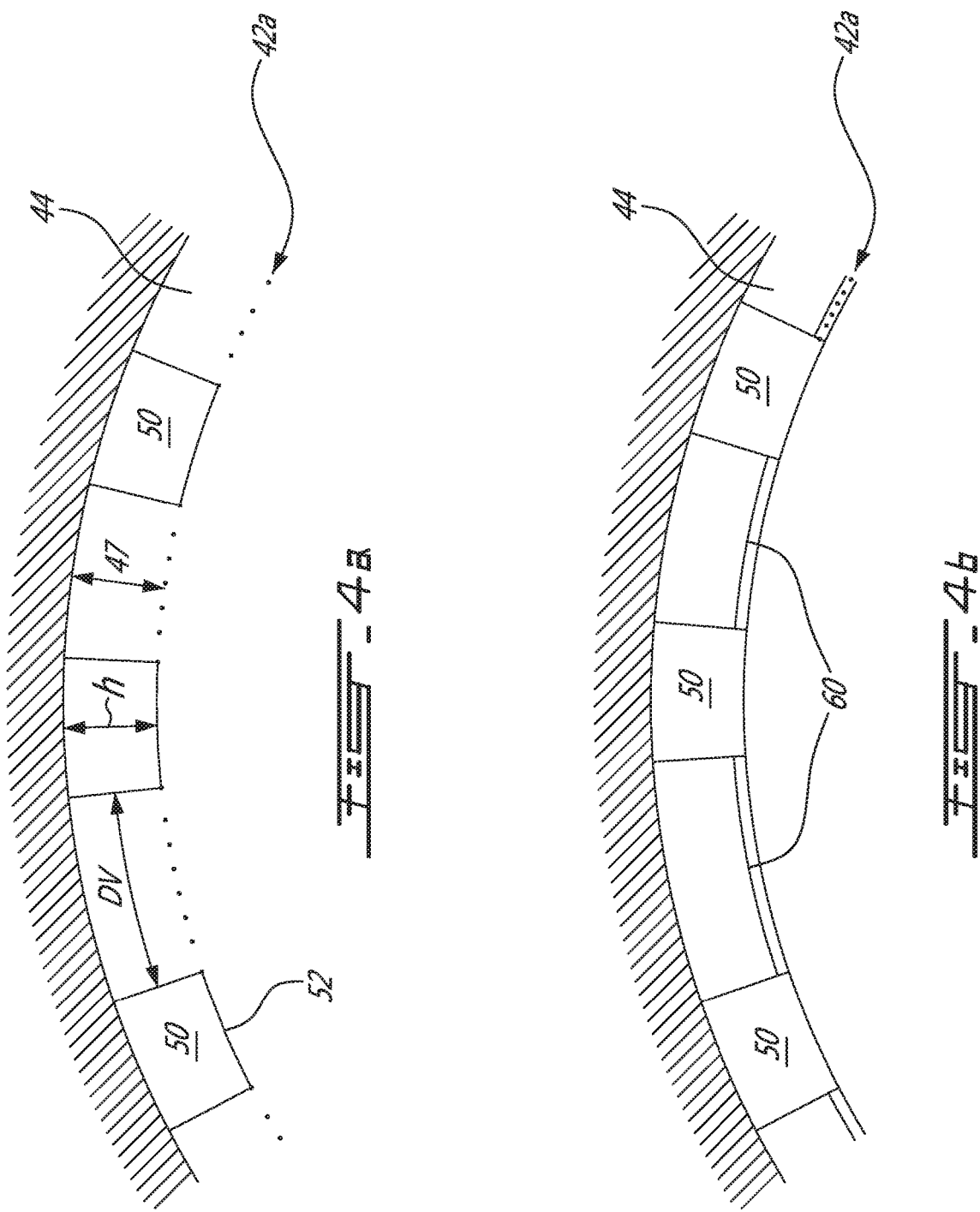

ROTOR CASING

TECHNICAL FIELD

The application relates generally to gas turbine engines and, more particularly, to rotor casings.

BACKGROUND OF THE ART

In gas turbine engines, the flow occurring between the tip of a rotor and the surrounding wall, known as tip clearance flow, negatively impacts rotor performance and operational effectiveness, as well as on the long-term physical integrity of both the rotor and its downstream components. In turbofan applications, tip clearance flow has a negative impact on the performance and operational effectiveness of the fan, as well as on the long-term physical integrity of the downstream bypass duct stator.

There is an ongoing need for ways to reduce such negative impacts of tip clearance flow, more specifically for ever more efficient casing design for addressing such negative impacts.

SUMMARY

In one aspect, there is provided a gas turbine engine with a central engine axis comprising a rotor, mounted for rotation about the central engine axis, having a plurality of blades radially extending into an annular gas path, the blades having blade tips and the annular gas path having a gas path outer line; and a casing having an inner casing wall surrounding the annular gas path, the inner casing wall comprising an annular recess positioned radially outwardly of the gas path outer line and axially downstream of the rotor blades, and a plurality of circumferentially spaced-apart vanes positioned within the annular recess.

In accordance with another aspect, there is provided a gas turbine engine with a central engine axis comprising: a casing having an inner casing wall circumscribing a gas path; a rotor mounted for rotation about the central engine axis, the rotor having a plurality of blades radially extending into the gas path; an annular recess defined in the inner casing wall downstream of the rotor blades; and a plurality of vanes circumferentially distributed within the annular recess, the plurality of vanes having a vane height (h) less than or equal to a depth of the annular recess.

The vanes may have a vane height at least 3 times the tip clearance, the tip clearance being the radial distance between the inner casing wall and the blade tips. The vane height may furthermore not exceed 5 times such tip clearance.

The vanes may have vane chord lengths being greater than the vane heights. The vane chord lengths may furthermore be at least 4 times greater than the vane heights.

The vanes may be profiled and circumferentially spaced from one another to accelerate air flowing between circumferentially adjacent vanes.

The vanes may be airfoil shaped and spaced from one another a circumferential distance that is between 80% and 100% of the vane chord lengths.

The vanes may have vane chord lengths that do not exceed 90% of an axial length of the recess. The vane chord lengths may furthermore be at least 50% the axial length of the recess.

The gas turbine engine may comprise an airflow partition extending between the top edges of at least 2 circumferentially adjacent vanes, from each such vanes' leading edge to each such vanes' trailing edge.

In another aspect, there is provided a gas turbine engine with a central axis comprising an annular axially extending gas path, a plurality of rotor blades mounted for rotation about the central engine axis and radially extending into the gas path, the gas path having a gas path outer line, a casing surrounding the rotor blades and the gas path, the casing having an inner casing wall comprising a plurality of circumferentially spaced-apart recessed vanes positioned axially downstream of the rotor blades and radially outside the gas path outer line.

In a further aspect, there is provided a gas path casing treatment method for a gas turbine engine having a case surrounding a rotor having a plurality of radially extending blades mounted for rotation about a central engine axis, each blade radially extending into an annular gas path, the case having an inner casing wall defining a gas path outer line, the method comprising forming on the inner casing wall, downstream of the rotor blades, an annular recess, extending radially outside the gas path outer line; and positioning, within the annular recess and radially outside the gas path outer line, a plurality of circumferentially spaced-apart vanes.

Further details of these and other aspects of the subject matter of this application will be apparent from the detailed description and drawings included below.

DESCRIPTION OF THE DRAWINGS

Reference is now made to the accompanying figures in which:

FIG. 2 is a schematic cross-sectional sectional view of the recess in the bypass air duct casing of the engine shown in FIG. 1, FIG. 3a is a schematic top sectional view along line A-A of FIG. 2;

FIG. 3b is a schematic top sectional view along line A-A of FIG. 2 pursuant to an alternate embodiment of the invention;

FIG. 4a is a schematic front sectional view along line B-B of FIG. 2; and

FIG. 4b is a schematic front sectional view along line B-B of FIG. 2 pursuant to an alternate embodiment of the invention;

DETAILED DESCRIPTION

Figure 1:
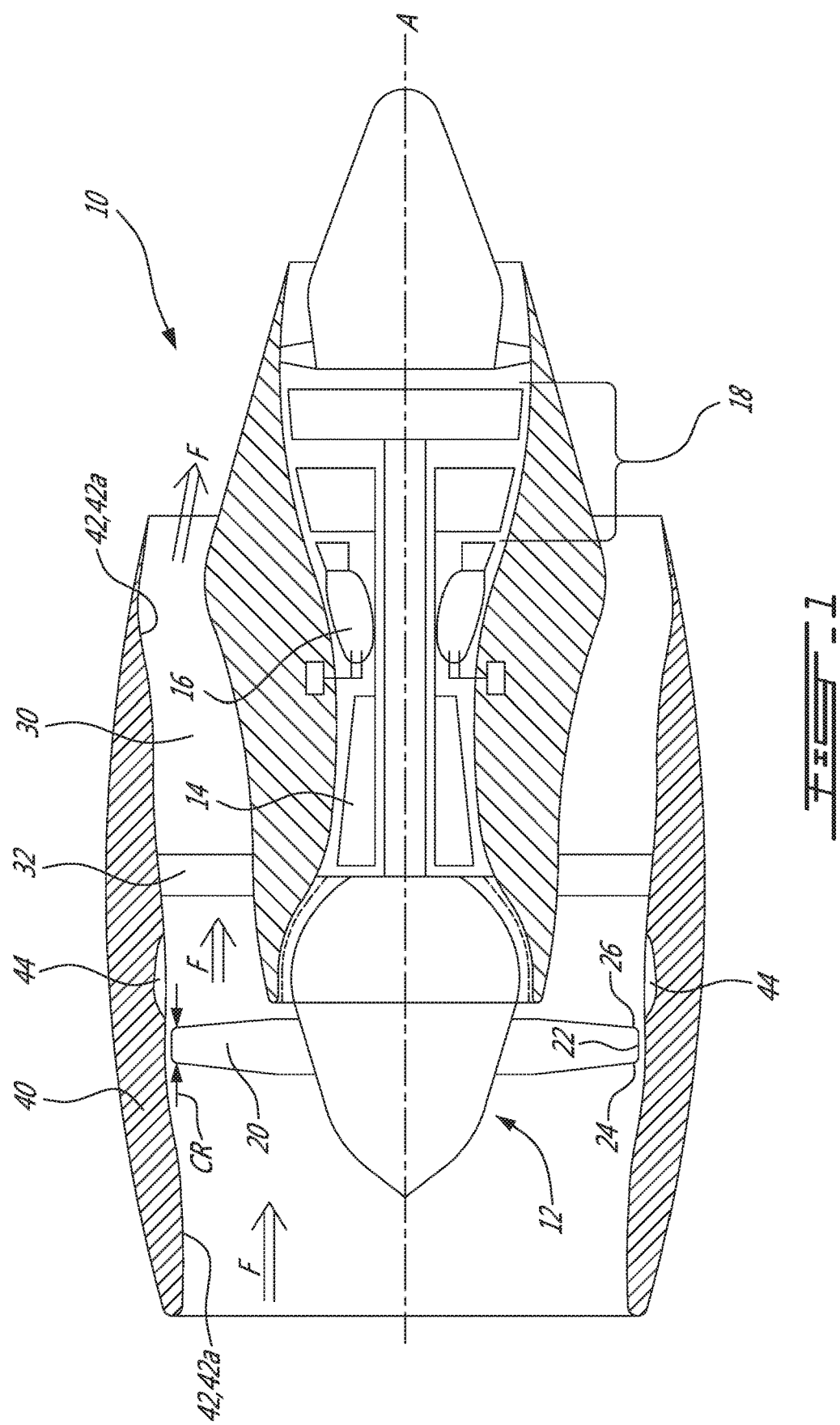
FIG. 1 is a schematic cross-sectional view of a gas turbine engine with a recess in the bypass air duct casing pursuant to an embodiment of the invention.

FIG. 1 illustrates a gas turbine engine 10 of a type preferably provided for use in subsonic flight, generally comprising in serial flow communication a fan 12 through which ambient air (represented by double arrow F) is propelled, a compressor section 14 for pressurizing the air, a combustor 16 in which the compressed air is mixed with fuel and ignited for generating an annular stream of hot combustion gases, and a turbine section 18 for extracting energy from the combustion gases.

The fan 12 comprises a plurality of radially extending blades 20 mounted for rotation (FIG. 3a shows direction of rotation R of blades 20) about a central axis A of the engine 10, each blade having a tip 22, a leading edge 24, a trailing edge 26 and a rotor tip chord length CR. Fan 12 not only propels ambient air towards compressor section 14, but also towards an annular gas path, positioned downstream of said fan 12; such annular gas path is known as a by-pass duct 30 and comprises components such as a by-pass duct stator 32.

Fan 12, more specifically the plurality of radially extending blades 20, and by-pass duct 30 are surrounded by a casing 40 (sometimes referred to as a case 40), whose inner casing wall 42 substantially tracks the gas path outer line 42a (thereby acting as a flow boundary wall), but for an annular recess 44 extending radially outwardly from gas path outer line 42a and positioned downstream of the trailing edges 26 of the fan blades 20. Gas path outer line 42a is the desired outer radial boundary for the air axially flowing through the gas path; in other words, gas path outer line 42a defines a flow path passage area that enables air to travel in the most efficient way (least losses) under all engine operating conditions Air flowing between tip 22 and inner casing wall 42, known as tip clearance flow, is a source of degradation for rotor performance and operational effectiveness, not only for fan blades 20, but also for downstream components such as by-pass duct stator 32. More specifically, tip clearance flow contributes to increased swirl and a thicker boundary layer in the radially outer portion of the airflow downstream of fan blades 20. Increased swirl and thicker boundary layer has a negative impact on the performance of downstream components such as by-pass duct stator 32. For reference purposes, tip clearance (t) will refer to the distance between tip 22 and inner casing wall 42.

As shown in more details in FIG. 2, recess 44 is positioned substantially downstream of trailing edges 26 of the fan blades 20. Recess 44 does not significantly axially overlap with any portion of fan blade 20 so as not to interfere with its operation; specifically, it has been found that recess 44 cannot overlap more than 10% rotor tip chord length CR, as anything more would unacceptably interfere with fan blade 20's operation. According to the illustrated embodiment, the recess does not axially overlap the fan blades. Rather the recess is axially spaced-apart downstream from the trailing edge 26 of the fan blades 20 by a predetermined distance. Recess 44 has an annular shape i.e. it extends around the whole circumference of casing 40. Recess 44 has a bottom surface 45 with a profile that, preferably, is conducive to air, flowing across such recess 44, being without any significant flow separation; more specifically, bottom surface 45 has an axial length L and a (varying as one travels axially along such bottom surface 45) depth 47 that creates an axial profile that minimizes disruptions/lateral mixing between airflow layers.

Within such recess 44 and along its whole circumference, a plurality of circumferentially spaced-apart vanes 50 project from bottom surface 45 up to, but not significantly beyond, gas path outer line 42a, more specifically vanes 50 project from bottom surface 45 a distance h (for reference purpose in remainder of this application, vane height h) not exceeding recess depth 47 of such bottom surface 45. Stated differently, recess 44 must be deep enough so that the whole of vanes 50 does not protrude beyond gas path outer line 42a and remain contained within the volume of recess 44. Vanes 50 are positioned a circumferential distance DV away from one another (shown in FIGS. 3a & 4a), circumferential distance DV being preferably the same between all adjacent vanes. Particulars of vanes 50 will now be described Vanes 50 have a top edge 52 which does not protrude beyond gas path outer line 42a; as outlined above, this means that vane height h does not exceed recess depth 47. As can be seen in FIG. 2, recess depth 47 varies along such depth's axial length and, consequently, vane height h can vary accordingly. Preferably, top edge 52 has an axial profile which matches the axial profile of gas path outer line 42a so to interfere as little as possible with the air flowing in by-pass duct 30; this means that, preferably, recess depth 47 is equal to vane height h. Vanes 50, which are recessed in casing 40, more specifically in inner casing wall 42, assist in drawing tip clearance flow within recess 44 and in reducing its negative effects on downstream components such as by-pass duct stator 32. More specifically, vanes 50 assist in reducing the swirl and the thickness of the boundary layer of such clearance flow by creating a low static pressure zone within recess 44. A certain balance must however be achieved when designing this low static pressure zone downstream of blades 20. Indeed, such low pressure zone must be low enough to have a meaningful effect on swirl/boundary layer thickness reduction, but not so low so as to have an unacceptable negative effect on the pressure ration across blades 20. In this respect, it is believed that optimal results are achieved when the ratio of vane height h over tip clearance t is between 3 and 5, preferably around 4.4. Stated differently, the ratio of vane height h over tip clearance t is:

$$3t \leq h \leq 5t, \text{ preferably } h \approx 4.4t$$

In the embodiment shown in FIG. 3a, vanes 50 have an airfoil shape and are positioned with respect to one another to accelerate the air flowing within recess 44. More specifically, vanes 50 have a pressure and suction side which are positioned with respect to fan blades 20 (and their direction of rotation R) so as to accelerate the airflow, more specifically the tip clearance flow, originating from fan blades 20. An efficient flow accelerating design for vanes 50 is believed to be achieved when circumferential distance DV between adjacent vanes are less than vane chord length CV, preferably between 80% and 100% of vane chord length CV. Stated differently, circumferential distance DV between adjacent vanes, in relation to vane chord length CV, is:

$$0.8CV \leq DV \leq CV$$

A shown in FIGS. 3A & 4A, vanes 50 have a leading edge 54, a trailing edge 56 and a vane chord length CV, such vane chord length CV exceeding vane height h (preferably 4 times vane height h). Stated differently, vane chord length CV, in relation to vane height h, is:

$$h \leq CV, \text{ preferably } 4h \leq CV$$

The dimensions of recess 44 are dictated by the dimensions of vanes 50. More specifically, besides recess depth 47 being dimensioned to ensure vanes 50 do not protrude past gas path outer line 42a, recess axial length L is dimensioned so as to contain vane chord length CV. As outlined above, bottom surface 45 has an axial profile that is conducive to air flowing across recess 44 being without any significant flow separation. In that respect, as is shown in FIG. 3a, it is believed that a recess axial length L that is sizeably longer than vane chord length CV, more specifically where vane chord length CV is between 50% and 90% of recess axial length L, contribute positively to minimizing disruptions/lateral mixing between airflow layers within such recess 44. Stated differently, recess axial length L is preferably such that, in relation to vane chord length CV, the following relationship is observed:

$$0.5\,L \leq CV \leq 0.9\,L$$

In an alternate embodiment, as shown in FIGS. 3a & 4a, an airflow partition 60 extends between the top edges 52 of at least 2 circumferentially adjacent vanes, from each such vanes' leading edges 54 to each such vanes' trailing edges 56. Such airflow partition 60 consequently prevents air flowing though recess 44 from entering or exiting the space contained within such adjacent vanes between such vanes' leading edges 54 and trailing edges 56. Such airflow partition 60 has a further positive effect to the airflow across recess 44 being without any significant flow separation.

The above description is meant to be exemplary only, and one skilled in the art will recognize that changes may be made to the embodiments described without departing from the scope of the invention disclosed. For example, whereas recessed vanes positioned on a bypass duct casing immediately downstream of a fan is described, it is possible to use the teachings of this invention for any rotor applications where tip clearance flow is an issue, such as where it negatively impacts the performance and/or the long-term physical integrity of downstream components. For example, it can be used in a compressor rotor or downstream of a turbine. Furthermore, whereas an annular recess extending around the whole circumference of the inner wall of the casing is described above, it is possible to have an annular recess not extending around the whole circumference of the inner wall of the casing i.e. it is possible to have recessed vanes only on circumferential portions of such inner wall.

The invention not only assists in improving fan performance/operational effectiveness and long-term physical integrity of downstream components (as outlined above), it has been found to also improve fan stall margins. Thus, a casing treatment method for existing engine cases is also possible pursuant to this invention. For example, an annular recess with projecting recessed vanes as outlined above may be introduced in engine cases that experience fan stalling issues. Furthermore, it is also believed that recessed vanes have a positive effect on rotor stall margins, such as fan stall margins. A casing treatment method for stall margin improvements is therefore also possible pursuant to this invention.

It is also believed that recessed vanes are more efficient than typical cooler options. Indeed, whereas typical cooler options require a certain fin surface area and protrusion within the gas path to achieved the necessary heat removal requirements, recessed vanes have greater heat handling capacity, because of the higher velocity of the air flowing through such vanes, and less negative airflow consequence, because such vanes do not protrude in the gas path. Indeed, it is believed that recessed vanes with significantly less surface area than typical cooling fins can meet the same heat removal requirement of such cooling fins.

Still other modifications which fall within the scope of the present invention will be apparent to those skilled in the art, in light of a review of this disclosure, and such modifications are intended to fall within the appended claims.

The invention claimed is:

1. A gas turbine engine with a central engine axis comprising: a casing having an inner casing wall circumscribing a gas path; a rotor mounted for rotation about the central engine axis, the rotor having a plurality of rotor blades radially extending into the gas path; an annular recess defined in the inner casing wall downstream of the plurality of rotor blades; a plurality of vanes circumferentially distributed within the annular recess, the plurality of vanes having a vane height (h) less than or equal to a depth of the annular recess; wherein the plurality of rotor blades have a tip defining a tip clearance (t) with the flow boundary surface, and wherein the vane height (h) is at least 3 times the tip clearance (t); and wherein the vane height (h) does not exceed 5 times the tip clearance.

2. The gas turbine engine as defined in claim 1, wherein each vane of the plurality of vanes further has a vane chord length (cv), the vane chord length (cv) being greater than the vane height (h).

3. The gas turbine engine as defined in claim 2, wherein the vane chord length is at least 4 times greater than the vane height (h).

4. The gas turbine engine as defined in claim 1, wherein each vane of the plurality of vanes further has a vane chord length (cv), the vane chord length (cv) being at least 4 times greater than the vane height (h).

5. The gas turbine engine as defined in claim 1, the plurality of vanes being profiled and circumferentially spaced from one another to accelerate fluid flowing between circumferentially adjacent ones of the plurality of vanes.

6. The gas turbine engine as defined in claim 1, the plurality of vanes being airfoil shaped and spaced from one another a circumferential distance that is between 80% and 100% of a vane chord length (cv).

7. The gas turbine engine as defined in claim 1, wherein the plurality of vanes have vane chord lengths (cv) that do not exceed 90% of an axial length (L) of the annular recess.

8. The gas turbine engine as defined in claim 7, wherein the vane chord lengths (cv) are at least 50% the axial length (L) of the annular recess.

9. The gas turbine engine as defined in claim 1, the plurality of vanes having leading, trailing and top edges, further comprising an airflow partition extending between the top edges of at least two circumferentially adjacent ones of the plurality of vanes, from each such vanes' leading edge to each such vanes' trailing edge.

10. The gas turbine engine as defined in claim 5, the plurality of vanes having leading, trailing and top edges, further comprising an airflow partition extending between the top edges of at least two circumferentially adjacent ones of the plurality of vanes, from each such vanes' leading edge to each such vanes' trailing edge.

11. A gas turbine engine with a central axis comprising an annular axially extending gas path, a plurality of rotor blades mounted for rotation about the central engine axis and radially extending into the gas path, the gas path having a gas path outer line, a casing surrounding the plurality of rotor blades and the gas path, the casing having an inner casing wall comprising a plurality of circumferentially spaced-apart recessed vanes positioned axially downstream of the plurality of rotor blades and radially outside the gas path outer line; wherein the plurality of rotor blades have a tip defining a tip clearance (t) with the flow boundary surface, and wherein the vane height (h) is at least 3 times the tip clearance (t); and wherein the vane height (h) does not exceed 5 times the tip clearance.

12. The gas turbine engine as defined in claim 11, further comprising at least one annular recess, extending radially outside the gas path outer line, for containing the vanes.

13. The gas turbine engine as defined in claim 12, further comprising an airflow partition extending between top edges of at least 2 circumferentially adjacent vanes, from leading edges of each such vanes to trailing edges of each such vanes.

14. The gas turbine engine as defined in claim 11, the vanes being profiled and circumferentially spaced from one another to accelerate air flowing between circumferentially adjacent vanes.

15. A gas path casing treatment method for a gas turbine engine having a case surrounding a rotor having a plurality of rotor blades mounted for rotation about a central engine axis, each rotor blade of the plurality of rotor blades radially extending into an annular gas path, the case having an inner casing wall defining a gas path outer line, the method comprising: forming on the inner casing wall, downstream of the plurality of rotor blades, an annular recess, extending radially outside the gas path outer line; and positioning, within the annular recess and radially outside the gas path outer line, a plurality of circumferentially spaced-apart vanes; wherein the plurality of rotor blades have a tip defining a tip clearance (t) with the flow boundary surface, and wherein the vane height (h) is at least 3 times the tip clearance (t); and wherein the vane height (h) does not exceed 5 times the tip clearance.

16. A gas path casing treatment method as defined in claim 15, wherein the vanes are profiled and circumferentially spaced from one another to accelerate air flowing between circumferentially adjacent vanes.

17. A gas path casing treatment method as defined in claim 15, wherein each vane has a top, leading and trailing edges, the method further comprising attaching an airflow partition between the top edges of at least 2 circumferentially adjacent vanes, from leading edges of each such vanes to trailing edges of each such vanes.

18. A gas path casing treatment method as defined in claim 17, wherein the vanes being positioned on the inner casing wall, are profiled and circumferentially spaced from one another to accelerate air flowing between circumferentially adjacent vanes.

\* \* \* \* \*